United States Patent [19]

Schlanger

[11] Patent Number: 4,688,749

[45] Date of Patent: Aug. 25, 1987

[54] BICYCLE BRAKE CABLE STOP AND REAR CARRIER RACK ATTACHMENT BRACKET

[75] Inventor: Raphael Schlanger, New Rochelle, N.Y.

[73] Assignee: Cannondale Corporation, Georgetown, Conn.

[21] Appl. No.: 812,180

[22] Filed: Dec. 23, 1985

[51] Int. Cl.$^4$ .................... F16M 11/00; F16L 3/00
[52] U.S. Cl. .................................... 248/200; 248/49
[58] Field of Search ............... 248/200, 300, 65, 58, 248/49; 224/30 R, 39, 42.03 B, 42.07; 280/289 A; 188/24.11

[56] References Cited

U.S. PATENT DOCUMENTS

| | | | |
|---|---|---|---|
| 779,709 | 1/1905 | Hedstrom | 224/30 R UX |
| 2,823,002 | 2/1958 | Savitz | 248/65 |
| 4,019,705 | 4/1977 | Habuda et al. | 248/58 |

FOREIGN PATENT DOCUMENTS 3105231  2/1982  Fed. Rep. of Germany ........ 248/58

Primary Examiner—Ramon O. Ramirez
Attorney, Agent, or Firm—Brumbaugh, Graves, Donohue & Raymond

[57] ABSTRACT

A bracket adapted to be fastened to the seat stays of a bicycle frame is a unitary member of general U shape having a base portion and a pair of leg portions. The base portion has a hole adapted to receive a stop fitting for a brake cable sheath, and each leg has a hole adapted to receive a fastener by which each of a pair of rear carrier rack attachment arms is attached to the respective seat stays.

1 Claim, 3 Drawing Figures

BICYCLE BRAKE CABLE STOP AND REAR CARRIER RACK ATTACHMENT BRACKET

BACKGROUND OF THE INVENTION

Among the important concerns of individuals who pursue bicycle touring is that the bicycle they use have convenient and reliable fittings for the components and accessories. In the case of the brakes, the functioning of the brakes requires that the cable sheath be "stopped" (secured) strongly adjacent the caliper, inasmuch as the cable run from the operating levers to the stop must be constrained to a fixed length so that movements of the operating levers produce corresponding movements of the calipers. With center pull calipers, a stop for the cable sheath of the rear brakes is received by a special separate bracket affixed (usually by brazing) to the seat stays above the seat stay bridge.

A strong rear carrier firmly attached to the bicycle frame is a "must" bicycle touring. Maximum lateral rigidity for minimum "tail wagging" of the bicycle caused by loads on the rear rack is best obtained by a rear rack having four points of attachment of the rack to the frame, two being the attachments of the struts of the rack to the rear wheel dropouts and the other two being the attachments of a pair of seat stay connecting arms of the rack to the seat stays. Sometimes those arms are attached to the seat stays by ring clamps. Alternatively, each seat stay has a lug with a hole for a fastener that accepts the respective arm on the rack.

SUMMARY OF THE INVENTION

The present invention is a bracket adapted to be fastened to the seat stays of a bicycle frame for stopping the rear brake cable sheath and for connecting the two arms of a four-point rear carrier to the seat stays. The bracket is a unitary member of generally U-shape including a base portion having a hole adapted to receive a stop fitting for the brake cable sheath and a pair of leg portions, each having a hole adapted to receive a fastener by which a respective seat stay attachment arm of the rear carrier is attached to the seat stays. An important advantage of the invention is that only a single element is fastened to the frame, as compared to two, in the case of separate rear rack lugs and three in the case of separate rack lugs and a brake cable sheath stop. The bracket can be made strong without a weight or size penalty, as compared to comparably strong separate elements. Unlike individual lugs, which depend primarily on a good brazed joint for resistance to a binding failure, the bracket has inherent strength that essentially eliminates the potential for failure by bending. The bracket is of uncluttered and durable appearance, as compared to separate fittings, which is something experienced and discriminating bicycle tourists particularly appreciate.

For a better understanding of the invention, reference may be made to the following description of an exemplary embodiment, taken in conjunction with the accompanying drawing.

DESCRIPTION OF THE EMBODIMENT

Figure 1:
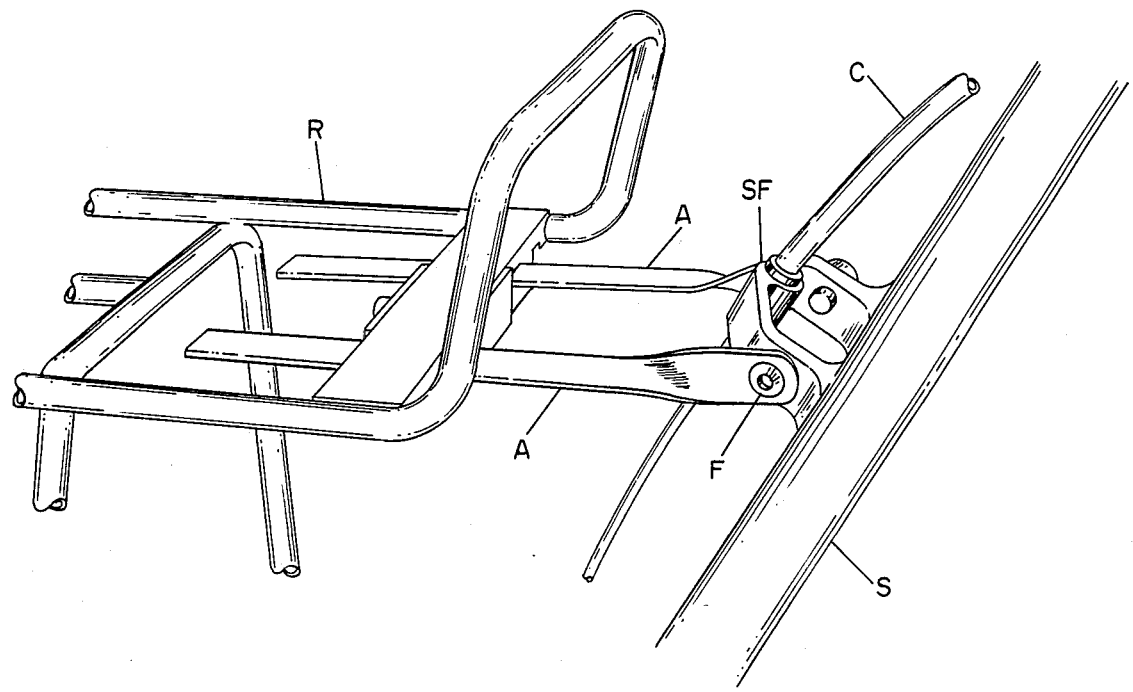
FIG. 1 is a pictorial view of the embodiment of the bracket as installed on the bicycle frame and assembled with the brake cable and the rear carrier attachment arms.

The pictorial view of FIG. 1 is taken from a vantage point that lies approximately on the plane of the seat stays, so only one seat stay S is visible. The brake cable C enters the view from the upper right where it turns down from its run along the top tube (not shown). The front part of the platform of the rear rack R appears in the left in FIG. 1. The rack R has a pair of laterally spaced-apart, horizontally-extending arms A for attaching the rack to the seat stays, each arm being a metal band suitably attached flatwise to the rack platform, preferably for lengthwise adjustment, twisted 90° at its front end to position the front tips flatwise in the vertical direction, and having a hole for a fastener (covered by the head of the screw F in FIG. 1).

Figure 2:
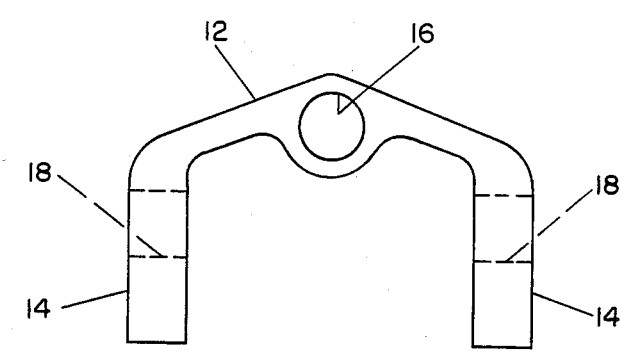
FIG. 2 is a top plan view of the bracket of FIG. 1.
Figure 3:
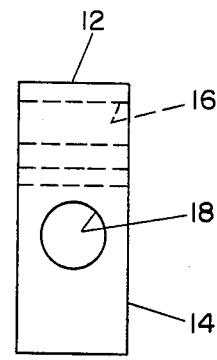
FIG. 3 is a side elevational view of the bracket.

The embodiment of the bracket 10 is a unitary member of generally U shape in plan (see FIG. 2) that includes a base portion 12 and a pair of legs 14. A hole 16 extends orthogonally to the major plane of the bracket through the transverse center of the base portion 12 and is adapted to receive a standard stop fitting SF for the brake cable sleeve (see FIG. 1). Each leg portion 14 of the bracket has a hole 18 extending laterally (i.e., substantially orthogonally to a bisecting plane of the bracket that includes the axis of the brake cable stop hole 16). The respective holes 18 receive fasteners for connecting the rack arms to the seat stays, the bracket, of course, being affixed to the seat stays at the proper location for assembly with the brake cable sheath and the rear carrier rack arms.

The particular bracket 10 shown in the drawings is designed for use on an aluminum frame bicycle. Hence it is made from aluminum and is TIG welded to the seat stays. A convenient way of making the bracket is to extrude long lengths of stock having a cross section corresponding to the top plan profile (FIG. 2), cut pieces from the stock and drill and, if desired, tap the holes 16 and 18. With aluminum for use with screws (e.g., the allen head screws shown in FIG. 1), it is desirable to install threaded stainless steel sleeves in oversize holes 16 in the legs of the bracket, lest the user strip the soft aluminum threads. Of course, nuts and bolts can be used to join the rack arms A to the brackets.

The brackets can, of course, be made of other materials and by other techniques, such as by casting, forging or stamping. Brackets made from a material other than aluminum can be fastened to an aluminum frame by rivets, or other fasteners or by an adhesive. Steel brackets can be welded or brazed to the seat stay of a steel frame.

I claim:

1. In a bicycle having a pair of seat stays, the improvement of a unitary bracket of generally U-shape having a base portion and a pair of leg portions, the bracket being fastened to the seat stays by joinder of each leg with one of the seat stays and being oriented with the base portion spaced apart rearwardly of the seat stays, the base portion having a hole extending substantially parallel to a plane defined by the axes of the seat stays and being adapted to receive a stop fitting for a brake cable sheathing, and each leg portion having a hole extending substantially orthogonally to the hole in the base portion and being adapted to receive a fastener by which each of a pair of rear carrier rack attachment arms is attached to the seat stays.

* * * * *